(12) United States Patent
Menth et al.

(10) Patent No.: US 7,929,434 B2
(45) Date of Patent: Apr. 19, 2011

(54) METHOD FOR DETERMINING LIMITS FOR CONTROLLING TRAFFIC IN COMMUNICATION NETWORKS WITH ACCESS CONTROL

(75) Inventors: Michael Menth, Oellingen (DE); Jens Milbrandt, Würzburg (DE); Phuoc Tran-Gia, Würzburg (DE)

(73) Assignee: Siemens Aktiengesellschaft, Munich (DE)

( * ) Notice: Subject to any disclaimer, the term of this patent is extended or adjusted under 35 U.S.C. 154(b) by 1465 days.

(21) Appl. No.: 10/542,723

(22) PCT Filed: Jan. 14, 2004

(86) PCT No.: PCT/EP2004/000213
§ 371 (c)(1),
(2), (4) Date: Jul. 20, 2005

(87) PCT Pub. No.: WO2004/066566
PCT Pub. Date: Aug. 5, 2004

(65) Prior Publication Data
US 2006/0056299 A1    Mar. 16, 2006

(30) Foreign Application Priority Data
Jan. 20, 2003 (DE) .................................. 103 01 966

(51) Int. Cl.
*G01R 31/08* (2006.01)
(52) U.S. Cl. .................. 370/230; 370/235; 370/237
(58) Field of Classification Search .............. 370/235, 370/230, 237
See application file for complete search history.

(56) References Cited

U.S. PATENT DOCUMENTS
4,872,157 A * 10/1989 Hemmady et al. ............ 370/400
(Continued)

FOREIGN PATENT DOCUMENTS
EP       1 202 501 A2    5/2002
WO    WO 01/28167 A1    4/2001

OTHER PUBLICATIONS

Tejinder S. Randhawa and R.H.S. Hardy, "Performance Evaluation of Bandwidth Partitioning in Broadband Networks", Proceedings of the IEEE Conference 2000 on High Performance Switching and Routing, Heidelberg, Germany, Jun. 26, 2000, pp. 411-418, XP-001075729.

(Continued)

*Primary Examiner* — Seema S Rao
*Assistant Examiner* — Sai-Ming Chan

(57) ABSTRACT

The invention relates to a method for determining limits for the access control of traffic that is to be transmitted via a communication network. The limits are fixed in such a way that no overload situation can occur in the network; the probability of rejection of traffic flows is, wherever possible, is independent from the point of entry into said network; and resources are used as efficiently as possible. On the basis of limits wherein no overload situation occurs, the limits for the traffic control are raised in such a way that the blocking probability for traffic transmitted between pairs of marginal modes is lowered at the same time. The lowereing of said blocking probability is maintained if an overload situation were to occur in the network. For pairs of marginal nodes contributing to the occurrence of an overload situation, the limits for traffic transmitted between the marginal nodes are fixed at a value prior to or during the overload situation, the limits for traffic transmitted between the marginal nodes are fixed at a value prior to or during the overload situation. The method can be continued for the other pairs until all limits have been set. The method results in efficient transmission of energy while maintaining quality of service parameters.

16 Claims, 1 Drawing Sheet

U.S. PATENT DOCUMENTS

| | | | |
|---|---|---|---|
| 5,727,051 A * | 3/1998 | Holender | 379/112.05 |
| 6,788,646 B1 * | 9/2004 | Fodor et al. | 370/230 |
| 6,904,017 B1 * | 6/2005 | Meempat et al. | 370/238 |
| 2002/0027885 A1 * | 3/2002 | Ben-Ami | 370/254 |
| 2002/0145982 A1 | 10/2002 | Talpade et al. | |
| 2004/0100901 A1 * | 5/2004 | Bellows | 370/230 |
| 2004/0114539 A1 * | 6/2004 | Beshai et al. | 370/254 |

OTHER PUBLICATIONS

Vittoria De Nitto Persone and Vincenzo Grassi, "Optimal acces control for integrated services wireless networks", Elsevier Online, Computer Communications, vol. 21, Nov. 25, 1998, Retrieved from the Internet on Jun. 16, 2004, pp. 1559-1570, XP-002284845.

* cited by examiner

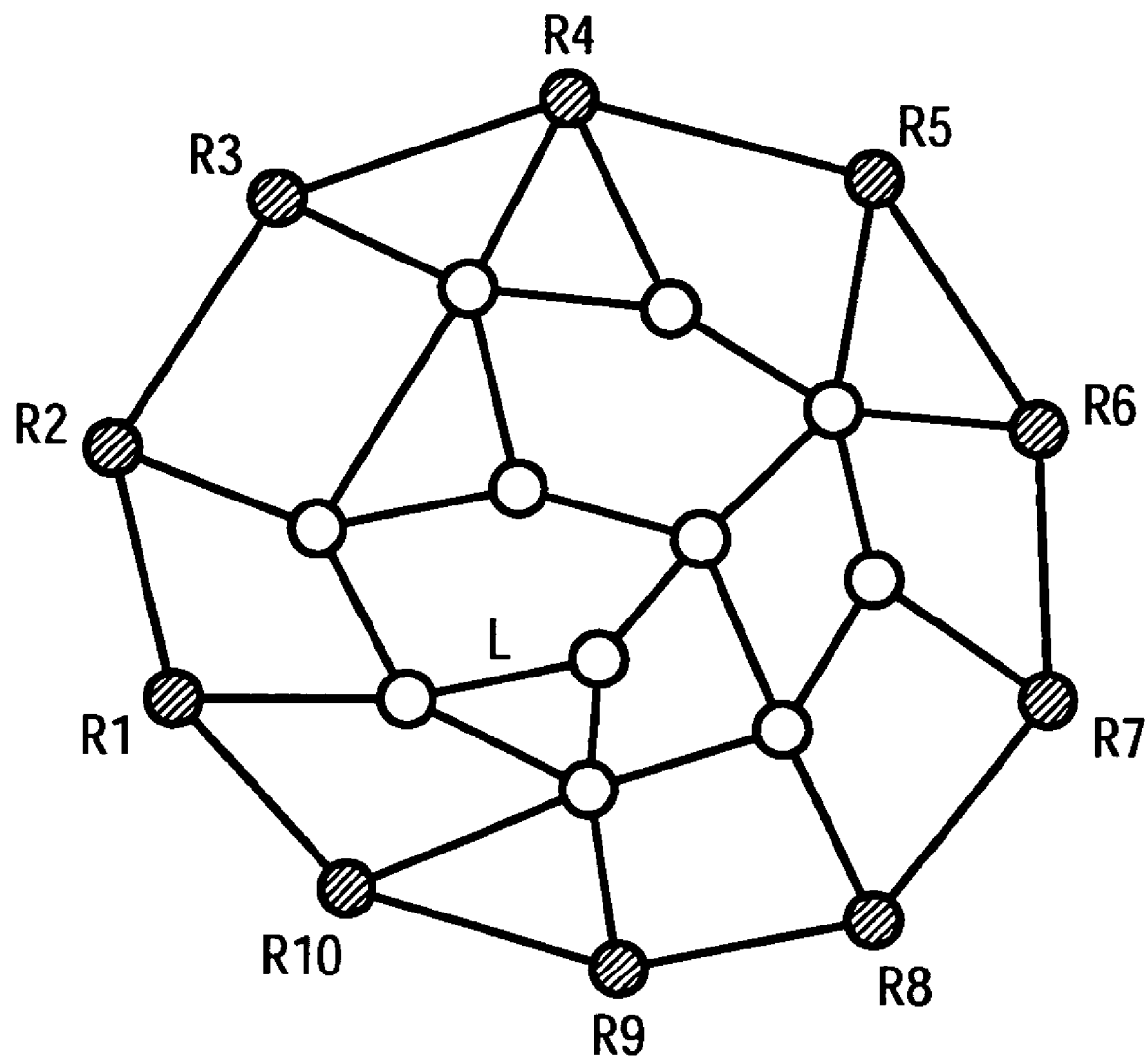

METHOD FOR DETERMINING LIMITS FOR CONTROLLING TRAFFIC IN COMMUNICATION NETWORKS WITH ACCESS CONTROL

CROSS REFERENCE TO RELATED APPLICATIONS

This application is the US National Stage of International Application No. PCT/EP2004/000213, filed Jan. 14, 2004 and claims the benefit thereof. The International Application claims the benefits of German application No. 10301966.9, filed Jan. 20, 2003, both applications are incorporated by reference herein in their entirety.

FIELD OF INVENTION

The invention relates to a method for a balanced determination of values for limiting traffic in a communication network with access controls, with the communication network being formed by nodes and connection links and with access being controlled by means of a limit value for at least a part of the traffic which is to be transmitted between marginal nodes over the network.

SUMMARY OF THE INVENTION

The control or limiting of the traffic—both data traffic and voice traffic—is a central problem for communication networks which use connectionless operation where traffic is to be transmitted with high quality-of-service requirements, such as voice data transmission for example. Suitable mechanisms for checking the traffic are currently being investigated by network specialists, telecommunications engineers and Internet experts.

Possibly the most important current development in the network area is the convergence of voice and data networks In the future transmission services with a very wide diversity of requirements will be transmitted over the same network. The feature which marks out such developments is that a large part of the communication over networks in the future will be via networks which operate in connectionless mode, the most important representative of which is what is known as the IP (IP: Internet Protocol) network. The transmission of what is referred to as realtime traffic, e.g. voice or video data over data networks while preserving quality-of-service features is the prerequisite for successful network convergence. For the transmission of realtime traffic over data networks in particular narrow limits have to be adhered to as regards delay times and the packet loss rate of data packets.

One possibility for transmission in real time over data networks while maintaining quality-of-service features is to switch a connection through the entire network, i.e. to define and reserve in advance the operating means or resources required for the service. The provision of sufficient resources to guarantee the service features is then monitored for each connection section (also known as a "link"). Technologies which operate in this way are for example ATM (ATM: Asynchronous Transfer Method) or the MPLS (MPLS: Multiprotocol Label Switching) protocol which provides for the definition of paths through IP networks. The disadvantage of these methods however is their great complexity and—in comparison to conventional data networks—lower flexibility Status information about the flows switched through the network must be stored or checked for the individual links.

A method which avoids the complexity of link-by-link checking or control of resources is what is known as the Diff-Serv concept. This concept is referred to as "stateless" to indicate that no status information about data connections or flows along the transmission path has to be maintained. Despite this the Diff-Serv concept only provides for access control at the margins of the network. With this access control packets can be delayed in accordance with their service features, and—if necessary—discarded. This is also described as traffic conditioning or policing, traffic shaping and traffic engineering. The Diff-Serv concept thus allows a distinction to be made between different traffic classes—frequently called classes of service—which can be prioritized in accordance with the transmission requirements and/or handled with a lower priority. Lastly with data transmission with the aid of the Diff-Serv concept it is not possible to guarantee that service features are maintained for realtime traffic. There are no mechanisms available to adapt the realtime traffic transmitted over the network so that reliable statements about the maintenance of the service features would be possible.

SUMMARY OF THE INVENTION

It is thus desirable for the control of the realtime traffic transmitted over the data network to be good enough that on the one hand service features can be guaranteed and on the other hand optimum use is made of resources, without having to take account of the complexity of connections switched through the network.

The object of the invention is to specify an optimized method for the definition of limit values for traffic restriction in a communication network.

The object is achieved by the claims.

In accordance with the invention limit values are defined for limiting traffic in a communication network (e.g. an IP network). For data transmission over the communication network there is provision for access control to be undertaken for at least a part of the traffic to be transmitted—e.g. for one or more classes of service before resources of the network are used for transmission. Access is controlled in this case at marginal nodes of the communication network formed by nodes and links. A marginal node in this case can be a network access node (also known as an ingress node) or a network output node (also known as an egress node), as well as an end or start note of a data transmission located in the communication network, i.e. a node of the network which represents a source or sink as regards the traffic. In the latter case the term "marginal" in the word marginal node does not refer to the network but to the transmission path of data packets.

The starting point for the invention is the consideration that balanced traffic handling which is subject to access control, before network resources are made available for the traffic, is present if the likelihood of a non-approval or rejection of the traffic is as independent as possible from the marginal nodes (e.g. ingress nodes and egress nodes) or the transmission path. The invention will look at a plurality of pairs formed by the marginal nodes. A pair of marginal nodes can be associated with the set of possible paths leading through the network which run between the two marginal nodes. With the pairs of marginal nodes the sequence of the marginal nodes is taken into account, i.e. two marginal nodes can define two different pairs depending on how the sequence of the two marginal nodes is looked at. In other words, for association of different paths with pairs of marginal nodes the paths are assigned a direction or a direction sense. Pairs of marginal nodes can for example consist of a an ingress node and an egress node, of an ingress node and a network node which can be receiver or addressee of transmitted data, as well as a network node which functions as a transmitter, and an egress node.

The probability of non-approval of traffic or of flows which are subject to an approval check at an marginal node can be estimated using traffic models. The invention starts from the assumption that with the aid of a traffic model the probability of rejection of traffic—referred to below as blocking probability—will be determined. This type of traffic model typically delivers values for the average traffic intensity between two marginal nodes and specifies a relationship for taking the traffic fluctuations into account. For example it can be assumed that traffic fluctuations belong to a Poisson distribution with which the probability (in our case the blocking probability) of the limit value for the access control being exceeded can be estimated. The blocking probabilities and the limit values for access control are interrelated and can generally be converted into one another. With the method in accordance with the invention, for plurality of pairs formed from marginal nodes, the initialization step consists of setting the blocking probabilities by defining the limit values for the access control so that they are essentially the same. The initial blocking probabilities here are chosen so that they are big enough for no overload situations to occur in the network. This definition corresponds to fair handling of the data stream transmitted between the marginal nodes, to the extent that there is practically the same probability of it being allowed or rejected. With this definition however there is as yet no guarantee that the resources available to the network will be used efficiently. As regards efficient resource utilization, the method in accordance with the invention makes provision for lowering the blocking probability, i.e. increasing the limit values for access control correspondingly until an overload situation occurs. The lowering of the blocking probabilities or the increasing of the limit values for the approval checking is undertaken such that the blocking probabilities remain essentially the same for the pair of marginal nodes. For the pairs of marginal nodes involved when the overload situation arises, the blocking probabilities are essentially set to the value at which the overload situation would be caused by raising the limit values. For example the blocking probabilities are lowered step-by-step and the value of the blocking probabilities and thereby also the value of the corresponding limits is then set for the pairs contributing to the overload situation to the value that it had in the step directly before the overload situation occurred.

The advantage of the invention is that in a network without explicit path reservation limits can be defined for access control in a balanced and resource-efficient way. In accordance with a development of the invention limit values are defined for all pairs of the plurality of pairs formed from marginal nodes. In this case, for pairs which were not involved in the occurrence of the first overload situation, the blocking probability is further lowered simultaneously for all remaining pairs until a second overload situation occurs. For the pairs involved in the occurrence of the overload situation the blocking probabilities or the limit values are essentially frozen or maintained at the value which they had on occurrence or shortly before the occurrence of the overload situation. This step is then repeated until such time as limit values have been defined for all pairs i.e. the blocking probability is simultaneously increased for the remaining pairs until an overload situation occurs in which, for the pairs involved in the overload situation, the blocking probability is retained until such time as the blocking probability is in place for all pairs.

With this development there are two points to note:
1. The development leads to an assignment of blocking probabilities or limit values for all pairs since a blocking probability of zero for a pair would mean that one would be able to transmit an unlimited amount of traffic between the edge points of the pair without any overload situation arising, which is evidently not the case for real networks.
2. The blocking probability or limit values for all pairs of the plurality of pairs is defined so that a lowering of the blocking probability of any given pair from the plurality would lead to an overload situation. In this sense an optimum utilization of the resources available to the network is produced.

The plurality of pairs includes for example all pairs of ingress nodes and egress nodes. In this case complete control of the traffic entering the network and leaving the network again is provided, or of the traffic of the class of service which is subject to access control. The setting of the limits or the choice of the blocking probabilities guarantees that no overload situation occurs; As a consequence definitive statements can be made about the quality-of-service features. The setting of limits for access control then opens up the possibility of quality of service with simultaneously a best possible utilization of the resources available.

Communication networks have physical restrictions for the transmission capacity over the connection sections or links which are enclosed by the network. The maximum transmission capacity of the individual links defines an upper limit for the traffic able to be transmitted over the link in question. Frequently limits on the traffic volume over the individual links are set lower than the maximum physical capacity in order to provide spare capacity on the one hand and on the other hand to prevent faults occurring in the network. In the latter case the focus is frequently on the resilience of a network, i.e. the capability of ensuring problem-free transmission even with failures of network elements. For the communication network discussed above the limits for the traffic on the individual links can for example be selected so that the failure of one (or more) links does not lead to the physical limits for the capacity of the other links being exceeded, i.e. even if a link fails the traffic which was subject to access control can be managed. An overload situation in the sense of the method in accordance with the invention can then be defined as the fact that the defined limits for the traffic volume on this link could have been exceeded on a connection section or a link of the network. Checking the communication network for the possibility of an overload situation can be undertaken for example with the aid of a model for the load distribution within the network. A check is made for example using a simulation program as to whether there are links in the communication network for which a maximum traffic load within the framework of the defined limits would lead to the permitted traffic volume for the link being exceeded. Another slightly modified definition would be that the limits covering volume of traffic on the individual links would be likely to be exceeded with high predefinable probability. The pairs of marginal nodes which contribute to an overload situation produced by a limit value being exceeded for the traffic on a link would then be those to which paths could be assigned which run via the link which is causing the overload situation. In traffic theory the term traffic pattern is usually used to designate the real (instantaneous) traffic present at the inputs of the network. Checking for an overload situation can then be undertaken by checking whether the traffic pattern allowed by the limits, taking into account the routings undertaken in the network, would then lead to an overload situation or not.

The object of the invention is explained in more detail below within the context of an exemplary embodiment which refers to a FIGURE.

BRIEF DESCRIPTION OF THE DRAWING

The sole FIGURE shows a network made up of nodes and links.

DETAILED DESCRIPTION OF THE INVENTION

The FIGURE shows a network made up of nodes and links. In this case the marginal nodes R1 to R10 are indicated by solid circles. The internal nodes are indicated by non-solid circles. Links are illustrated by connectors between nodes. For the network different types of peripheral conditions can be defined which guarantee approval control at the margin of the network. The type of peripheral conditions can for example be selected to depend on the topology of the network. The form of the peripheral conditions helps to decide on the blocking probabilities for which an overload situation occurs in accordance with the inventive method. Possible peripheral conditions are:

1. Limits for the traffic which is transmitted between two marginal nodes, i.e. a limit value in each case for a pair $(R_i, R_j)$, $j, i \in \{1, \ldots, 10\}$, which is defined by two marginal nodes.
2. Limit values for all ingress and egress nodes. If we assume that all marginal nodes $R_i$, $i \in \{1, \ldots, 10\}$ are both ingress and egress nodes, this would produce 20 limit values, with two limit values, an ingress value and an egress value being assigned to a node in each case. For a flow which is to be transmitted from the ingress node $R_i$ to the egress node $R_j$ a check would then be made on whether the node would exceed the ingress limit for $R_i$ or the egress limit for $R_j$. Exceeding the limit would result in rejection.
3. Ingress and egress limit values as for Point 2. but for all links of the network. This means that for each link L one has two limits per marginal node in each case. For the transmission of a flow from node $R_i$ to node $R_j$ the ingress limits of $R_i$ and the egress limits of $R_j$ would be checked which relate to links over which the flow is to be transmitted.

To simplify matters the explanation belows assumes the form of limits described in 1. above. They are to form the basis of a traffic model which allows an average volume of traffic between two marginal nodes $R_i$ and $R_j$ to be determined. The average traffic between two marginal nodes $R_i$ and $R_j$ is designated for simplicity's sake as $V_{ij}$. Likewise $G_{ij}$ is taken as the limit value for the traffic transmitted from the ingress node $R_i$ to the egress node $R_j$. A flow to be transmitted from $R_i$ to $R_j$ is allowed if the aggregated traffic between $R_i$ and $R_j$ would not exceed the limit $G_{ij}$. In this case $j, i \in \{1, \ldots, 10\}$ always applies. The traffic model uses the average traffic values $V_{ij}$ and assumptions about the statistical fluctuations, which belong to a Poisson distribution for example. To initialize the method the limit values $G_{ij}$ are set so (low) that the same blocking probabilities exist for all pairs $(R_i, R_j)$ and that in addition no overload situation occurs. Checking for the occurrence of an overload situation can be undertaken for example by determining, for the maximum traffic load allowed by the limit values with the inclusion of the routings within the network, the traffic load of the individual links and comparing this with the limits or capacity of the links. In accordance with the invention the blocking probabilities are lowered by the same percentage ratio and the limit values $G_{ij}$ correspondingly increased. In this case, with the aid or the traffic model, for a set of reduced, similar values of the blocking probability a corresponding set of limit values $G_{ij}$ (analytical or numerical) is determined, which—within the framework of the traffic model—defines a non-approval with the reduced blocking probability for all pairs $(R_i, R_j)$. A check for overload follows. If no overload occurs the blocking probability is further lowered simultaneously for all communication links. This can for example occur through step-by-step lowering by 10 of the initial value. In one step, for example the fifth a bottleneck or an overload situation occurs on the link L, i.e. the limits for the capacity on this link would be exceeded by the choice of limits at step 5. The pairs (R1,R2), (R2,R1), (R1,R3), (R3,R1), (R1,R4) and (R4,R1) contribute to this overload situation for example. For these pairs the limits $G_{ij}$ or the blocking probability are then set to their value at step 4. The method is then continued for the remaining pairs $(R_i, R_j)$ until limits $G_{ij}$ are defined for all pairs $(R_i, R_j)$.

The invention claimed is:

1. A method for setting limit values of an access control for limiting traffic transmission in a communication network, wherein the communication network comprises a plurality of pairs of marginal nodes at margins of the network, each pair associated with a set of possible paths comprising internal nodes and internal links leading through the communication network which run between each pair and through which the transmission occurs along a possible path without explicit path reservation, the method comprising:

for each pair of marginal nodes in the communication network,
(a) initializing the limit values to a predetermined initial low value such that substantially the same high blocking probabilities exist for all pairs of marginal nodes thereby avoiding an overload situation in the communication network;
(b) iteratively increasing the limit values until an overload situation is identified at one of the internal links;
(c) determining which of the pairs of marginal nodes contributed to the overload situation at the identified internal link by determining which of the pairs have possible paths that run through the identified link;
(d) setting the limit value or the pairs of marginal nodes that contributed to the overload situation to a limit value of an immediately prior iteration;
(e) repeating steps (b) through (d) until limit values are set for all pairs of marginal nodes as overload situations are identified at other internal links,
thereby providing access control at the margins of the network by setting limit values for each pair of marginal nodes based on its respective contribution to overload situations occurring at internal links in the set of possible paths for that pair of marginal nodes.

2. The method in accordance with claim 1, wherein the blocking probabilities are related to not approving the transmission between the marginal nodes of the pairs.

3. The method in accordance with claim 1, wherein the marginal nodes include nodes of the network representing sources or sinks of traffic of the network.

4. The method in accordance with claim 1, wherein the marginal nodes are specified by ingress nodes and egress nodes of the network.

5. The method in accordance with claim 4, wherein the plurality of the pairs comprises all pairs of the network consisting of an ingress node and an egress node in each case.

6. The method in accordance with claim 1, wherein the overload situation is produced when in a scenario of high traffic load, in which the limit values for the access controls are still adhered to, a threshold value is exceeded on a link for the traffic transmitted over the link.

7. The method according to claim 6, wherein the threshold value for the traffic transmitted over the link is assigned to the link such that in case of failure of the link, the traffic allowed within the framework of the access controls does not represent any overload.

8. The method in accordance with claim 1, further comprising:
   making access checks for all the traffic of a class of service.

9. The method in accordance with claim 8, wherein the access checks relate to an approval or rejection of individual flows.

10. A network node with means for executing the method in accordance with claim 1.

11. The network node according to claim 10, wherein the network node is a marginal node of the network.

12. A method for setting limit values of an access control for limiting traffic transmission in a packet-switched communication network comprising a plurality of marginal nodes and a plurality of internal nodes, the method comprising:
   (a) identifying all pairs of marginal nodes in the network, wherein each pair of marginal nodes is identified as an origination and destination node of a given transmission in a given direction within the network, and not an intermediate internal node in the given transmission, and is associated with a set of possible paths comprising intermediate internal nodes and internal links leading through the network between each pair and through which traffic flows along a possible path without explicit path reservation;
   (b) using a traffic model to set an initially low traffic threshold value for each pair of marginal nodes so that substantially the same high blocking probabilities exist each pair of marginal nodes;
   (c) operating the network with communications traffic;
   (d) iteratively increasing the threshold values of all pairs of marginal nodes until congestion is detected on an internal link of at least one pair of marginal nodes;
   (e) reducing the threshold value for all pairs of marginal nodes that contributed to the detected congestion to the threshold value at the iterative step before the detected congestion, wherein the pairs of marginal nodes that contributed to the detected congestion comprise those airs of marginal nodes with possible paths that run through the internal link which is causing the congestion; and
   f) repeating steps (d) though (e) on the remaining pairs of marginal nodes until each of the pairs of marginal nodes has its threshold value reduced in accordance with its contribution to congestion;
   whereby traffic throughput of all marginal pairs of the network is optimized.

13. The method according to claim 12, wherein each pair of marginal nodes is defined as an ingress node and an egress node, or an ingress node into the network and an addressee node of the given transmission within the network, or a transmitter node of the given transmission within the network and an egress node from the network, regardless of traffic path and internal nodes for routing the given transmission between the pair of marginal nodes.

14. A method for setting limit values of an access control for limiting traffic transmission in a packet-switched communication network comprising a plurality of marginal nodes and a plurality of internal nodes, the method comprising:
   (a) identifying all pairs of marginal nodes in the network, wherein a pair of marginal nodes is defined as a starting and ending point of a given transmission in a given direction in the network, including an ingress node and an egress node, or an ingress node and an addressee node of the given transmission, or a transmitter node of the given transmission and an egress node, regardless of a path of the given transmission between the pair of marginal nodes and wherein each pair is associated with a set of possible paths comprising intermediate internal nodes and internal links leading through the network between each pair and through which traffic flows along a possible path without explicit path reservation;
   (b) estimating a traffic blocking probability for each pair of marginal nodes using a traffic model;
   (c) setting a traffic limit value for each pair of marginal nodes based on the traffic model low enough so that no overload situation occurs in the network, and wherein the high initial blocking probability for each of the pairs of marginal nodes is substantially the same;
   (d) operating the network with communications traffic;
   (e) raising the limit values on all of the marginal nodes, step by step, until a first overload occurs on an internal link of one or more pairs of overloaded marginal nodes, wherein the pairs of overloaded marginal nodes comprise those pairs of marginal nodes with possible paths that run through the internal link which is causing the congestion; and
   (f) reducing the limit value on each of the overloaded marginal nodes to the limit value at the step prior to the first overload, and not reducing the limit value on the remaining non-overloaded pairs of marginal nodes.

15. The method in accordance with claim 14, further comprising:
   raising the limit values of all of the remaining non-overloaded nodes, step by step, until a next overload occurs on one or more next pairs of overloaded marginal nodes; and
   reducing the limit value on each of the next overloaded marginal nodes to the limit value at the step prior to the next overload, and not reducing the limit value on the remaining non-overloaded pairs of marginal nodes.

16. The method in accordance with claim 15, further comprising repeating the steps of claim 15 in order one or more times.

* * * * *